United States Patent

[11] 3,560,821

[72] Inventor Thomas E. Beling
Framingham, Mass.
[21] Appl. No. 817,880
[22] Filed Apr. 21, 1969
[45] Patented Feb. 2, 1971
[73] Assignee Sigma Instruments, Inc.
South Braintree, Mass.
a corporation of Massachusetts

[54] PULSE TYPE DRIVE CIRCUIT FOR AN INDUCTIVE LOAD
12 Claims, 9 Drawing Figs.
[52] U.S. Cl. ................................. 318/138,
321/45, 328/67, 318/506, 318/507
[51] Int. Cl. ............................................. H02k 29/04
[50] Field of Search .................................... 318/138,
254, 227, 231, 506, 504, 505, 507; 321/45ER;
328/67, (Inquired)

[56] References Cited
UNITED STATES PATENTS
| | | | |
|---|---|---|---|
| 3,263,153 | 7/1966 | Lawn | 321/45(ER) |
| 3,308,371 | 3/1967 | Studtmann | 321/45 |
| 3,432,737 | 3/1969 | Hunter et al. | 321/45(ER) |
| 3,452,263 | 6/1969 | Newell | 318/138 |

Primary Examiner—G. R. Simmons
Attorney—McGlew and Toren

ABSTRACT: A pulse-type drive circuit, for an inductive load such as a winding of a stepping motor, comprises a power supply having one terminal connected, through a first transistor, to a first terminal of the inductive load. The second terminal of the inductive load is connected through a transistor switch, and in series with a current-sensing resistor, to ground. A Schmitt trigger controls conductivity of the transistor switch. A trigger pulse is applied to the first transistor and to the Schmitt trigger, whereby the first transistor and the transistor switch are made conductive to energize the inductive load. When the current in the inductive load reaches a certain level, the current-sensing resistor actuates the Schmitt trigger to block the transistor switch. The first terminal of the inductive load is connected to ground through a blocking diode, and the second terminal is connected to the power supply through a back biased diode. When the load current is interrupted by blocking of the transistor switch, the power in the inductive load is transferred back to the power supply.

The power supply may include a high voltage source connected to the first transistor and a low voltage source connected to the first terminal of the inductive load, with the first transistor being triggered by a "turn on" pulse. The drive circuit may be modified to energize a winding of a stepping motor in opposite directions throughout its entire length and a constant current feedback circuit may be included in the drive circuit.

INVENTOR.
THOMAS E. BELING
BY
McGlew & Toren
ATTORNEYS

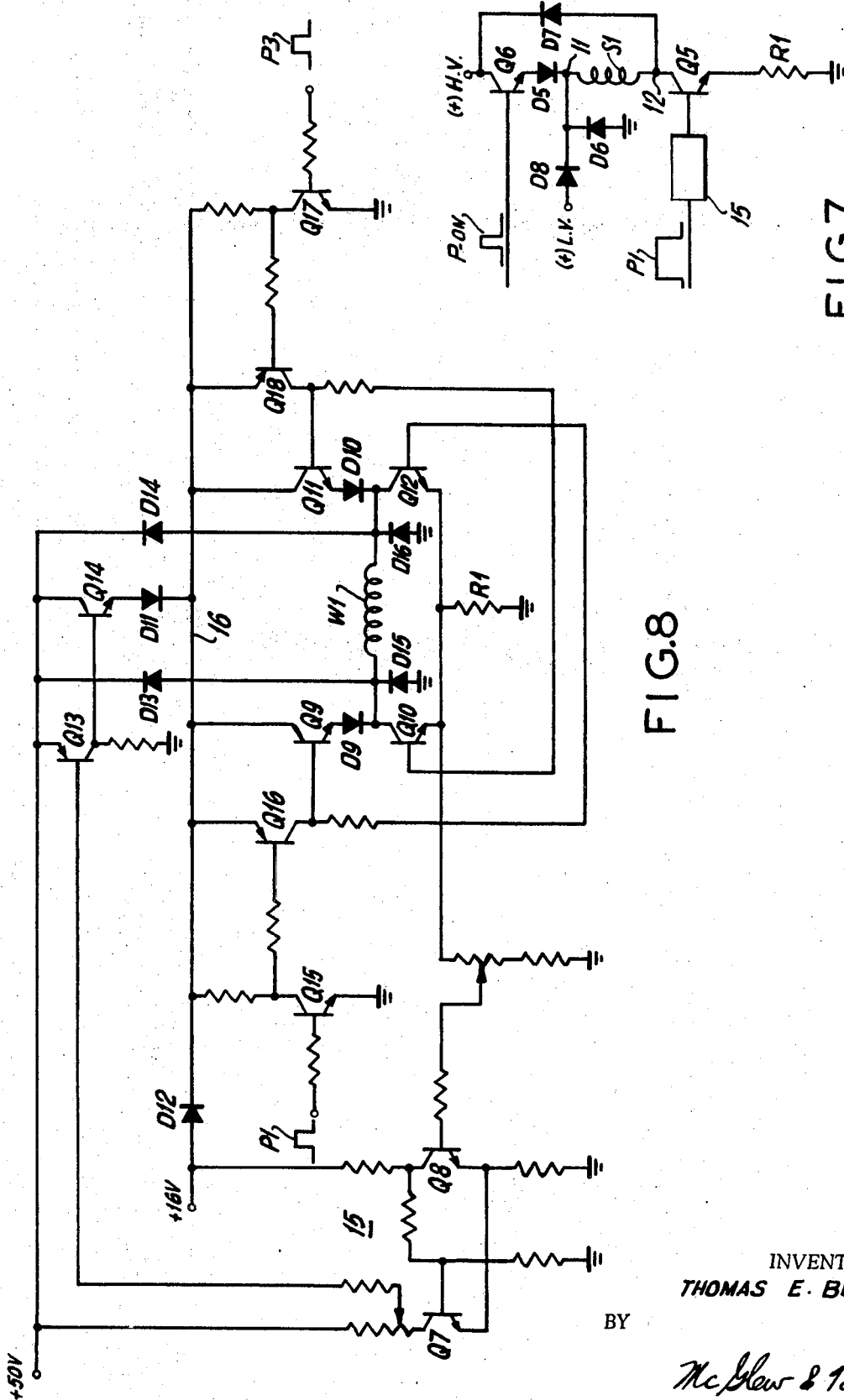

PULSE TYPE DRIVE CIRCUIT FOR AN INDUCTIVE LOAD

BACKGROUND OF THE INVENTION

A stepping motor generally includes four windings which are energized successively and cyclically one at a time by applied pulses. While four separate windings may be used, the usual arrangement comprises two center tapped windings having switching transistors connected to opposite ends thereof, and associated with diodes for proper direction of current flow therethrough. The performance of a stepping motor is heavily dependent upon its drive system, to the point where it is impossible to give meaningful performance data, in the form of speed-torque curves, without specifying the characteristics of the drive system.

Essentially, a stepping motor winding can be viewed as an inductance in series with a resistance, or essentially as an inductive load having a resistance. The current is pulsed into the windings in timed sequence, generally by means of transistor switches. In a typical circuit for providing the switching sequence for a stepping motor, transistor switches are included as well as diodes, which latter are necessary to catch the inductive spike generated at turnoff. While simple, this known drive circuit is quite ineffective for any high performance applications.

A rather disappointing speed-torque curve will be generated, because the current rise and decay in the motor windings is governed by the L–R ratio of the motor windings. Typically, this is in the range of a few milliseconds. A simple solution to this problem is to lower the time constant of the system by adding external resistance to each motor winding, and increasing the supply voltage proportionately. Such an arrangement results in improved speed-torque characteristics, and is simple to design. However, it suffers from two disadvantages.

In the first place, efficiency is rather poor. A drive that is effective in achieving good torque-speed characteristics necessarily dissipates, in the series resistance, three to 10 times the power delivered to the motor. In turn, this requires a larger power supply, increased power drain and removal of the heat generated in the series resistance. Clearly, the importance of these factors varies greatly with the motor size, but one recommended drive circuit for a stepping motor dissipates about 100 watts in the series resistors, while the series resistors for moderately effective driving of a larger motor will dissipate in excess of 800 watts.

A second disadvantage of simple current-limiting resistor arrangements is that they are not particularly effective in the rate of current rise that can be achieved with a given voltage supply. Inherently, this occurs because the voltage applied across the motor decreases exponentially while the current is rising. Obviously, if the voltage across the motor can be held to the high value until the current rises to the proper level, a faster rate of rise of current can be achieved.

In order to avoid these losses which occur in simple drive circuits, several driving systems or drive circuits have been designed and tested. While these yield good results in terms of increased efficiency and good speed-torque characteristics, this is at the expense of somewhat higher complications and cost in the electronics of the drive.

SUMMARY OF THE INVENTION

This invention relates to pulse-type drive circuits for inductive loads, such as stepping motors, and, more particularly, to an improved pulse-type drive circuit for inductive loads characterized by faster pulse rise times and greatly decreased power losses.

Basically, the pulse-type drive circuit of the present invention comprises at least one electric potential source and a first switch means, such as a first resistor, connected between one terminal of the source and a first terminal of an inductive load. A second switch means, in the form of a transistor switch, is connected to a second terminal of the inductive load and, through a current lever-sensing resistor or the like, to ground. Input pulse means are connected to the first switch means to supply triggering pulses thereto to supply current from the source to the inductive load, and are also connected to the level-sensing means. The level-sensing means, upon application of a pulse thereto, triggers the transistor switch to connect to the second terminal of the inductive load to ground. The level-sensing means may also include a suitable switching device, such as a Schmitt trigger, connected to the transistor switch. When the load current attains a preselected value, the level-sensing means triggers the second switch means, or transistor switch, to block current flow from the inductive load to ground.

A recirculate loop is provided, and includes a polarized circuit connecting the second terminal of the inductive load to the potential source. Upon interruption of the flow of current through the inductive load, the load current is returned from the load to the potential source through this recirculate loop.

With such an arrangement, the pulse rise and fall times are as short as possible within the limitations of the supply voltage or potential, and the only losses are he low switching losses in the transistor switches. The supply voltage can be increased as desired to reduce the pulse rise and fall times without increasing switching losses or power drain.

In one embodiment of the invention only a single potential source is connected, through the mentioned first transistor, to the first terminal of the inductive load. However, in another embodiment of the invention, a source of high voltage has its one terminal connected to the first terminal of the inductive load through the first transistor, and a source of relatively low potential is connected directly to the first terminal of the inductive load. A turn-on pulse is applied to the first transistor to connect the source of high voltage to the inductive load. This high voltage is used only during the rise and fall times, and the low voltage supply maintains the motor current during stepping of a stepping motor, for example.

As a further feature of the invention, either of the two mentioned drive circuits can be applied to a bipolar drive in which current is made to flow, selectively, in either direction through the full length of a motor winding. By this arrangement, it is possible to double the motor efficiency by using a reversing current source. This may be compared to conventional drives for such motors which use only half of each winding during each step of the motor. However, if a motor output is limited by heating, it is possible to double the output torque, for a given input power, by utilizing a bipolar drive and thus achieve a very considerable gain.

As still a further feature of the invention, a feedback drive circuit is provided and uses pulse operation to supply rapidly rising and falling currents to an inductive winding without excessive dissipation. This latter arrangement involves a Schmitt trigger and an associated capacitor. The Schmitt trigger cuts off the supply voltage when the motor current rises to the appropriate level, and the current remains cut off until the charge on the capacitor decays, which reverses the Schmitt trigger to again supply current to the motor. With appropriate choice of time constants, the motor current is substantially constant as the decay of the current occurs in a time determined by the inherent motor time constant. A feature of the arrangement is the rapid decay of motor current without high power dissipation, as the motor current is returned to the power supply upon shutoff.

An object of the present invention is to provide an improved pulse-type drive circuit for an inductive load.

Another object of the invention is to provide such a pulse-type drive circuit characterized by a rapid pulse rise and greatly reduced power losses.

A further object of the invention is to provide such a pulse-type drive circuit including a recirculate loop for returning current from the inductive load, upon interruption of the current supply to the load, to a potential source.

Still another object of the invention is to provide such a pulse-type drive circuit including a high potential source for initiating the operation of the load and a low potential source maintaining operation of the load.

A further object of the invention is to provide such a pulse-type drive circuit including means for effecting reverse current flow through the entire length of a normally divided winding of a stepping motor.

Another object of the invention is to provide such a pulse-type drive circuit including feedback arrangement providing for a substantially constant current to the motor.

For an understanding of the principles of the invention, reference is made to the following description of typical embodiments thereof as illustrated in accompanying drawings.

BRIEF DESCRIPTION OF THE DRAWINGS

In the Drawings:

FIG. 7 is a schematic wiring diagram of another form of pulse-type drive circuit, for an inductive load, embodying the invention and using both a high voltage source and a low voltage source;

FIG. 8 is a schematic wiring diagram of a bipolar drive for a stepping motor, embodying the invention.

DESCRIPTION OF THE PREFERRED EMBODIMENT

In the following description, the invention will be described as applied to driving stepping motors, which constitute a typical example of an inductive load having some resistance associated therewith. However, it should be understood that the invention is applicable equally to other types of inductive loads such as, for example, magnetic clutches and brakes.

Stepping motors are used, for example, in machine tools and provide an open loop precise control system operating on digital information. In effect, they are digital to analogue converters, and replace servomotors with a closed loop, which provides an analogue feed.

Figure 1:
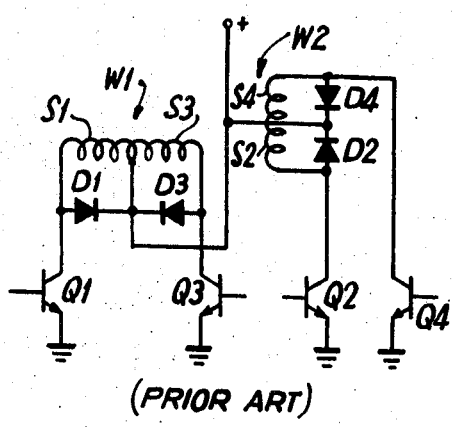
FIG. 1 is a schematic wiring diagram of a known drive circuit for a stepping motor.

As can be seen from the simple prior art drive circuit for stepping motors shown in FIG. 1, a stepping motor is essentially a two-phase motor including two windings W1 and W2, arranged electrically at 90° to each other. The windings are center tapped, so that winding W1 is divided into winding sections S1 and S3 and winding W2 is divided into winding sections S2 and S4.

The positive terminal of a power supply is connected to the center taps of the two windings, and the ends of the windings are connected to ground through respective transistors Q1, Q3, Q2, and Q4. The triggering pulses are applied, in a predetermined sequence, to the bases of these transistors to energize the winding sections S1—S4 in a predetermined order. Respective diodes D1—D4 are connected across the winding sections to "catch" the inductive spike generated by the associated winding when the current flow therethrough from the power supply is interrupted.

Figure 2:
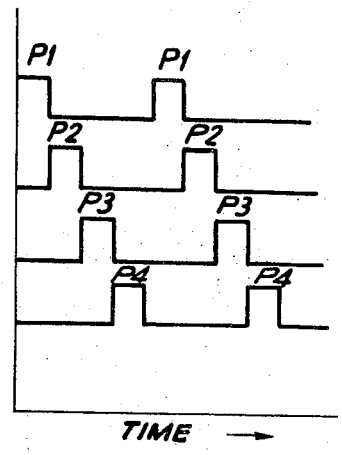
FIG. 2 is a graphic illustration of the pulse sequence for the motor schematically illustrated in FIG. 1.

The pulse sequence is illustrated in FIG. 2, from which it will be apparent that, responsive to each applied pulse, the motor is "stepped." Thus, first the winding S1 is energized, next the winding S2, then the winding S3 and finally the winding S4. As mentioned heretofore, the circuit of FIG. 1 results in the generation of a rather disappointing torque-speed curve, which can be improved by adding external resistance to each motor winding and correspondingly increasing the supply voltage.

Figure 3:
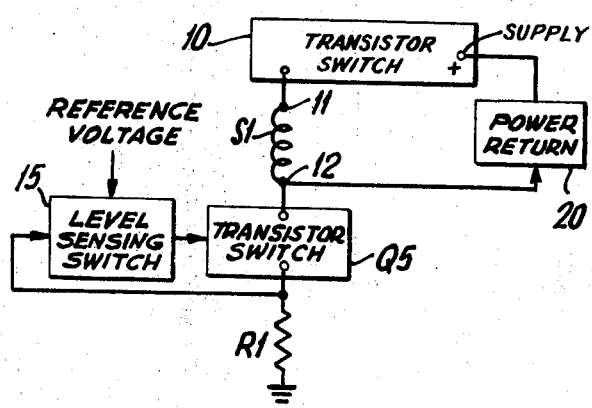
FIG. 3 is a block diagram of one form of pulse-type drive circuit, for an inductive flow, embodying the invention.
Figure 4:
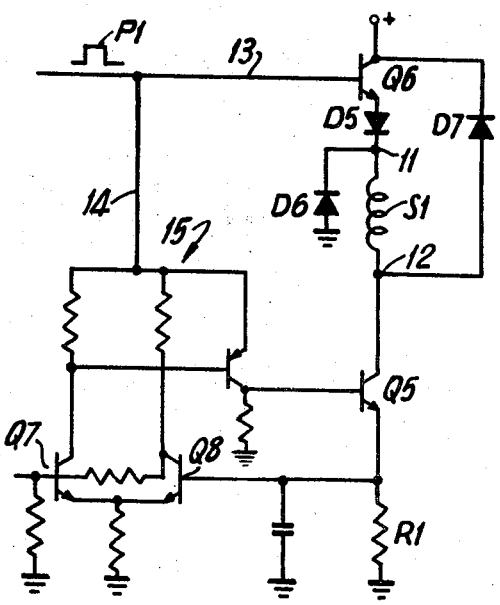
FIG. 4 is a schematic wiring diagram of the drive circuit shown in block form in FIG. 3.

The embodiment of the drive system in accordance with the invention illustrated in block form in FIG. 3 and schematically in FIG. 4 operates on the principle of a switching current regulator. The drive is illustrated as applied to the winding section S1 of a stepping motor such as shown in FIG. 1. Referring to FIG. 3, a power supply 10 has one terminal connected to a first terminal 11 of motor winding section S1, and a second terminal 12 of this winding section is connected to transistor Q5. Transistor switch Q5 is connected to ground through a current sensing resistor R1.

The on-off condition of transistor switch Q5 is controlled by a level-sensing means or switch generally indicated at 15, to which there is applied a reference voltage and also the voltage drop across resistor R1. A power return 20 connects winding terminal 12 to power supply 10 for return of power to supply 10 when transistor Q5 is blocked.

Referring now to FIG. 4, the positive terminal of power supply 10 is connected through a transistor Q6 and a diode D5 to terminal 11 of winding section S1. Terminal 12 of winding section S1 is connected to transistor switch Q5, and the latter is connected to ground through current sensing resistor R1. Stepping pulses P1 are applied to the base of transistor Q6 through a conductor 13, to trigger transistor Q6 conductive. These incoming or triggering pulses are also applied, through a conductor 14, to the level-sensing means or switch 15, which is the form of a Schmitt trigger including transistors Q7 and Q8.

Figure 5:
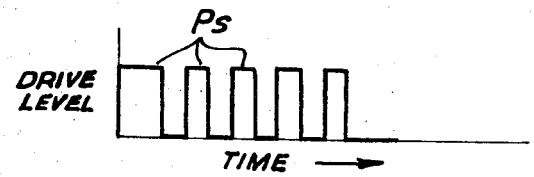
FIG. 5 graphically illustrates typical motor driving pulses supplied by the circuit shown in FIG. 3.

Each incoming pulse P1, through Schmitt trigger 15, triggers transistor Q5 conductive so that current will flow from the positive terminal through the winding section S1, thus energizing this motor winding section. When the current rises to a preselected value, this is sensed by resistor R1, and the resulting voltage drop across resistor R1 triggers Schmitt trigger 15 to its opposite state to block transistor Q5, thus interrupting current flow from the power source thorough winding section S1. This action is repeated, resulting in a series of pulses Ps, shown in FIG. 5, appearing at the base of transistor Q5.

Figure 6:
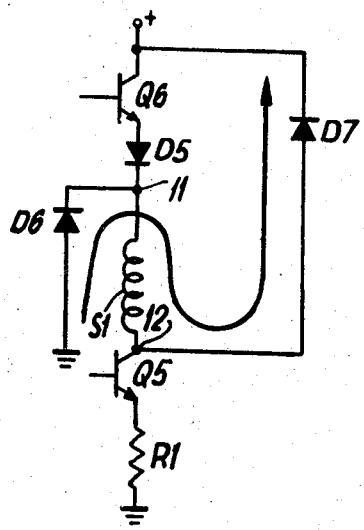
FIG. 6 is a schematic wiring diagram of a part of the circuit shown in FIG. 4 illustrating the return flow path for the load current.

A diode D6 is connected between winding section terminal 11 and ground, and diode D7, forming part of a return loop, is connected between winding section terminal 12 and the power supply. Upon interruption of the flow of current from the power supply through winding section S1 upon termination of the input pulse, the current of this winding section flows through diode D6, winding section S1 and diode D7 back to the power supply. This return flow path is illustrated in FIG. 6. During the time period of the input pulse, when the regulation of current occurs by means of the switching action illustrated in FIG. 5, the motor current return is through transistor Q6 and diodes D5 and D7. This path has essentially the time constant of the motor, so that relatively little current decay occurs, thus tending to keep the current steady during the pulse interval.

Thus, at the termination of each pulse, motor current is returned to the power supply, resulting in rapid turnoff of current. The pulse rise and fall times thus are as short as possible within the limitations of the supply voltage. The only losses in the system are the switching losses in the transistor switches. Additionally, the supply voltage can be increased as desired, to reduce the pulse rise and fall times, without increasing the switching losses for power drain.

In the embodiment of the invention shown in FIG. 7, the current rise and fall times are reduced by use of a high voltage supply which is applied only during the rise and fall times. A separate low voltage supply maintains the motor current during stepping of the motor.

Referring to FIG 7. the embodiment of the invention of the invention illustrated therein differs from that illustrated in FIG. 4 in that the positive terminal of a low voltage supply is connected through a diode D8 to the terminal 11 of winding section S1. Also, the triggering pulse P1 is applied only to the level-sensing switch or Schmitt trigger 15. Very short duration "on" pulses are applied to the base of transistor Q6. The pulses P-on may be obtained by differentiation of the leading edge of the pulses P1.

When pulse P-on is applied to the base of the transistor Q6, the high voltage supply positive terminal is connected to winding section S1. This results in a rapid rise in the current in the windings S1. Pulse P-on then terminates or decays, and transistor Q6 becomes nonconducting. The voltage for effecting current flow through winding section S1 is now supplied by the low voltage supply through diode D8. As pulse P1 falls, switch Q5 is turned off. The current in winding S1 is returned to the high voltage supply through diodes D6 and D7, resulting in a rapid fall of current in winding S1.

Conventional drives for stepping motors use only one half of a respective winding for each step. In a 4-phase stepping motor, it is, in general, possible to double the motor efficiency by driving each winding with a reversing current source. However, if a motor output is limited by heating, it is possible to double output torque for a given input power by utilizing a bipolar drive, and this is a very considerable gain. A typical bipolar drive in accordance with the invention is illustrated in FIG. 8.

Referring to FIG. 8, motor winding W1 is driven by means of a 4-transitor bridge, including transistors Q9, Q10, Q11 and Q12. This transistor bridge allows current reversal. Thus, and as will be explained in more detail hereinafter, when a pulse P1 is applied, transistors Q9 and Q12 are rendered conductive for current flow from left to right for winding W1. When a pulse P3 is applied, transistors Q11 and Q10 are triggered conductive for current flow from right to left to winding W1.

The bipolar drive illustrated in FIG. 8 is of the high efficiency type, previously described, wherein two separate power supplies are used, namely, a high voltage supply and a low voltage supply. Solely by way of example, the high voltage supply is indicated as a 50-volt supply and the low voltage supply as a 16 -volt supply. At the time of application of a pulse P1 to transistor Q15 to trigger transistors Q9 and Q12 conductive through transistor Q16, the Schmitt trigger, comprising transistors Q7 and Q8, is in a state where transistor Q7 is conductive thus making transistors Q13 and Q14 conductive. The high voltage is thus applied to conductor 16 through diode D11. The high voltage is thus applied to motor winding W1., for current flow from left to right therethrough, during the pulse rise time.

As soon as the motor current rises to the desired value, as sensed by the voltage drop across resistor R1, Schmitt trigger 15 changes state so that transistor Q14 is cutoff. The voltage is now supplied from the low voltage source at 16 volts. A blocking diode D12 is provided in conductor 16 to prevent flow of current from the high voltage source to the low voltage source during the time of the high voltage pulse. Current is thus drawn from the low voltage supply until pulse P1 terminates.

At the end of pulse P1, the motor current is returned to the high voltage supply through the recirculation loop including diodes D16 and D13. This type of operation results in a rapid rise and fall in the current without dissipation of the energy in large series resistors associated with the motor winding. It will be understood that an analogous operation takes place when a pulse P3 is applied to transistor Q17 to trigger transistors Q11 and Q10 conductive through transistor Q18. In this case, the power return loop at the termination of the pulse is formed by the diodes D15 and D14.

It should be noted that it is possible to use, with the bipolar arrangement of FIG. 8, the chopping mode of operation described in connection with FIGS. 3 and 4, and which allows the use of a single power supply while retaining the high efficiency features.

Figure 9:
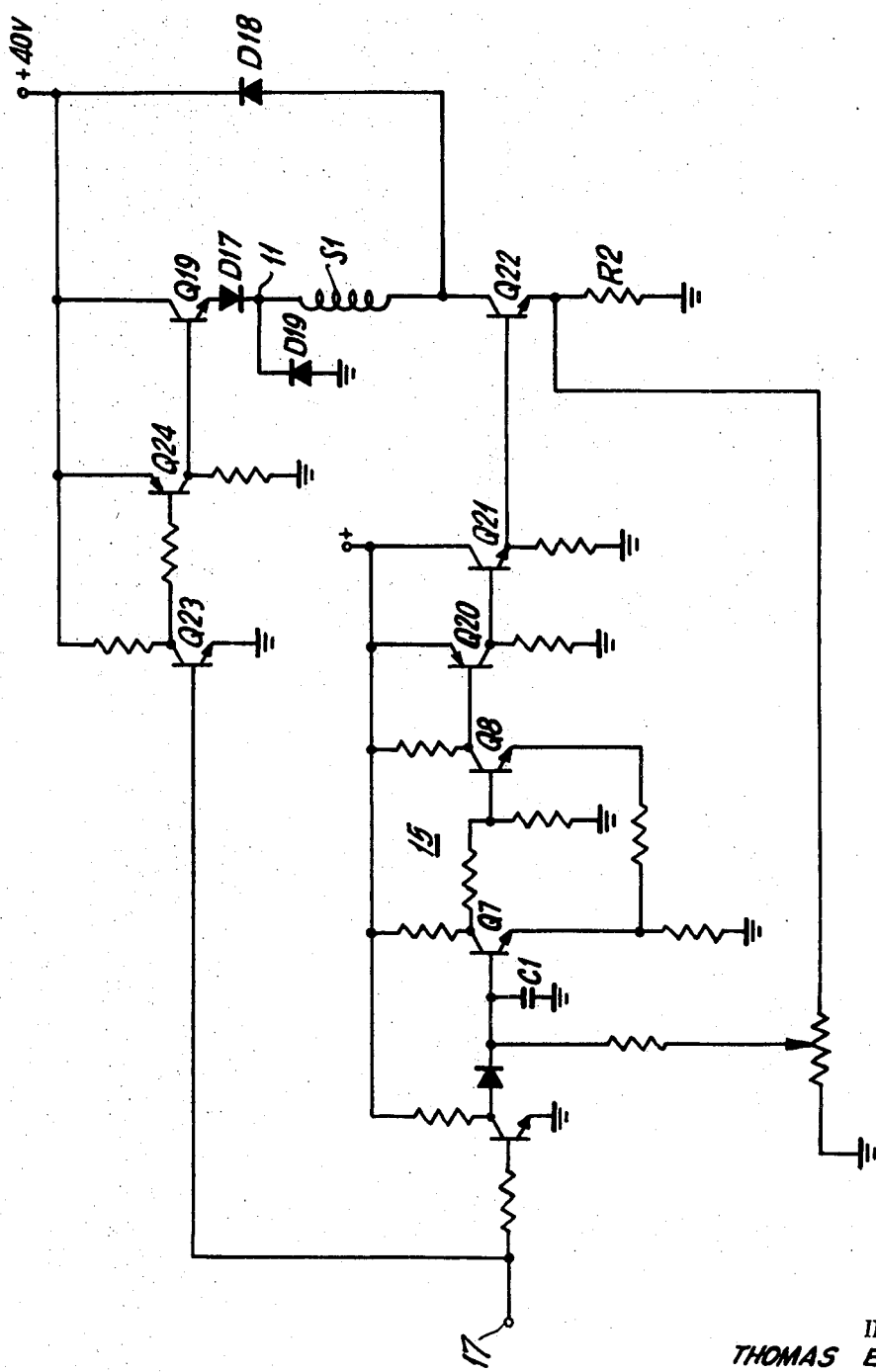
FIG. 9 is a schematic wiring diagram of a feedback constant current drive circuit, for a stepping motor, embodying the invention.

FIG. 9 illustrates a feedback drive circuit using pulsed operation to supply rapidly rising and falling current to an inductive winding, such as a motor winding, without excessive dissipation. In the circuit of FIG. 9, an input pulse at the terminal 17 connects the 40-volt supply circuit to the upper terminal 11 of motor winding S1 through transistor Q19 and diode D17. Transistor Q19 remains conductive for the duration of the pulse, and is triggered conductive through the cascade arrangement involving transistors Q23 and Q24. The pulse also turns on the Schmitt trigger including the transistors Q7 and Q8, so that transistors Q8, Q20, Q21 and Q22 are saturated. This results in the application of the full supply voltage to the winding S1.

When the motor current rises to the desired level, transistor Q7 is saturated, blocking transistor Q8 and cutting off transistor Q20, Q21 and Q22. Transistor switch Q22, which is connected to ground through a resistor R2, remains cut off until the charge on capacitor C1 decays and places Schmitt trigger 15 back into its normal state with transistor Q8 saturated.

With an appropriate choice of time constants, due to appropriate choice of condenser C1 and the associated resistor, the motor current is nearly constant, due to the fact that the inductive current circulates through transistor Q19, diode D17, winding S1 and diode D18 so that the decay of the motor current occurs in the time determined by the inherent motor time constant. At the termination of the pulse, transistors Q19 and Q22 are triggered nonconductive, and the motor current is returned to the power supply through diodes D19 and D18 of the power return loop. The arrangement shown in FIG 9 results in a rapid decay of motor current without high-power dissipation.

I claim:

1. A pulse-type drive circuit, for an inductive load, comprising, in combination, electric potential source means; first switch means connected between said source means and a first terminal of the inductive load; second switch means connected between a second terminal of the inductive load and ground; input pulse means connected to said first and second switch means to supply triggering pulses thereto to operate said switch means to supply current from said source means through the inductive load; load current level-sensing means connected to said second switch mean; said level-sensing means, when the load current attains a preselected value, triggering said second switch means to block current flow from said second terminal of the inductive load to ground; and a return loop, including a polarized circuit connecting said second terminal of the inductive load to said source means, returning current from the inductive load to said source means upon interruption of the flow of current from said second terminal of the inductive load to ground.

2. A pulse-type drive circuit, for an inductive load, as claimed in claim 1, in which said switch means are transistors.

3. A pulse-type drive circuit, for an inductive load, as claimed in claim 1, in which said return loop includes a first diode connected between ground and said first terminal of the inductive load and forwardly biased toward said first terminal, and a second diode connected between said second terminal of the inductive load and said electric potential source, and forwardly biased toward said electric potential source means.

4. A pulse-type drive circuit, for an inductive load, as claimed in claim 1, in which said current level-sensing means comprises a Schmitt trigger and current level-sensing component connected to said Schmitt trigger and sensing the load current.

5. A pulse-type drive circuit for inductive load, as claimed in claim 4, in which said current level-sensing component comprises a resistor connected between said second switch means and ground.

6. A pulse-type drive circuit, for an inductive load, as claimed in claim 4, including a condenser connected between said Schmitt trigger and ground.

7. A pulse-type drive circuit, for an inductive load, as claimed in claim 4, including means connecting said input pulse means to said Schmitt trigger.

8. A pulse-type drive circuit, for an inductive load, as claimed in claim 1, in which the inductive load is the winding of a stepping motor having said first and second terminals; said first switch means including a pair of first transistors each connected between said electric potential source means and a respective terminal of said motor winding; said second switch means comprising a pair of second transistors each connected between a respective terminal of said motor winding and ground; said current level-sensing means being commonly connected to both said second transistors; said input pulse means including a first input pulse means connected to that first transistor connected to said first terminal of the motor winding and that second transistor connected to said second terminal of the motor winding, and second input pulse means connected to that first transistor connected to said second terminal of the motor winding and to that second transistor connected to said first terminal of the motor winding; whereby, responsive to each input pulse, current flow through the entire length of the motor winding in a respective direction; said circuit including a pair of feedback loops, each including a respective polarized circuit connecting a respective terminal of said motor winding to said source means, returning current from said motor winding to said source means upon interruption of the connection between said motor winding and said electric potential source means through said first and second transistors.

9. A pulse-type drive circuit, for an inductive load, as claimed in claim 2, in which said level-sensing means includes a Schmitt trigger and a condenser connected between said Schmitt trigger and ground; means connecting said input pulse means to said Schmitt trigger and to said first transistor means; resistance means operatively associated with said condenser and determining the time constant of said drive circuit; said condenser, when the load current attains a preselected value, being charged to a potential switching said Schmitt trigger to trigger said second transistor means to block current flow from said second terminal of the inductive load to ground; said Schmitt trigger responsive to discharge of said condenser, switching to trigger said second transistor means to connect said second terminal of the inductive load to ground; whereby substantially constant current is supplied to the inductive load during the duration of an input pulse.

10. A pulse-type drive circuit, for an inductive load, comprising, in combination, a first source of high electric potential; first switch means connected between said first source and a first terminal of the inductive load; a second source of low electric potential connected to said first terminal of the inductive load; second switch means connected between the second terminal of said inductive load and ground; a blocking diode interposed between said second low potential source and said first terminal and forwardly biased toward said first terminal; first input pulse means applying a first pulse, of relatively very short duration, to said first switch means; and second input pulse means applying a second pulse, of relatively long duration, to said second switch means, said first and second pulses being initiated simultaneously; whereby said first high potential source is connected to the inductive load only during the rise time of the current in the inductive load, the current in the inductive load being maintained, during the remainder of the duration of the second pulse, by said second low potential source.

11. A pulse-type drive circuit, for an inductive load, as claimed in claim 10, in which said first switch means includes a first transistors and said second switch means includes a second transistor; a third transistor connected between said source of high electric potential and said first transistor; and level-sensing means connected to said source of high electric potential and to said third transistor; said level-sensing means, when the load current attains a preselected value, triggering said third transistor to block current from said first high potential source to said inductive load.

12. A pulse-type drive circuit for an inductive load, as claimed in claim 11, in which said level-sensing means includes a Schmitt trigger connected to said high potential source and to said third transitor; said level-sensing means further including a level-sensing component connected between ground and said Schmitt trigger.